Sept. 19, 1961 D. W. BREDE 3,000,582

TAPE REEL HOLD DOWN DEVICE

Filed Aug. 13, 1959

DWIGHT W. BREDE
INVENTOR.

BY Flehr and Swain

ATTORNEYS 3,000,582

TAPE REEL HOLD DOWN DEVICE

Dwight W. Brede, Mountain View, Calif., assignor to Ampex Corporation, Redwood City, Calif., a corporation of California Filed Aug. 13, 1959, Ser. No. 833,453
4 Claims. (Cl. 242—55.11)

This invention relates generally to devices for removably holding tape reels upon a turntable or the like rotatable means.

In conventional magnetic tape machines, the magnetic tape is wound upon plastic or metal reels. The hubs of these reels may be of substantial diameter. The hub includes an opening to accommodate hub engaging means carried by an associated turntable. It is important, particularly for precision multi-channel machines using tape reels of substantial size, to hold a reel properly aligned with respect to its axis of rotation, and with its one side in firm seating engagement with the seating surface of the turntable. In the past various devices have been used for releasably clamping or holding the reel upon the turntable.

It is an object of the present invention to provide a reel hold down device which will assure that the reel is properly aligned with respect to the axis of rotation and firmly seated on the turntable.

It is another object of the present invention to provide a reel hold down device employing a resilient hub engaging means for firmly seating and accurately aligning the reel.

It is a further object of the present invention to provide a reel hold down device employing a turntable hub which is engaged by the reel hub and means for causing the same to expand radially outwardly and simultaneously move towards the turntable whereby the reel is firmly seated against the surface of the turntable with the frictional engagement providing a drive means between the turntable and hub.

Additional objects and features of the invention will appear from the following description in which a preferred embodiment has been set forth in detail in conjunction with the accompanying drawing.

Referring to the drawing.

Figure 1:
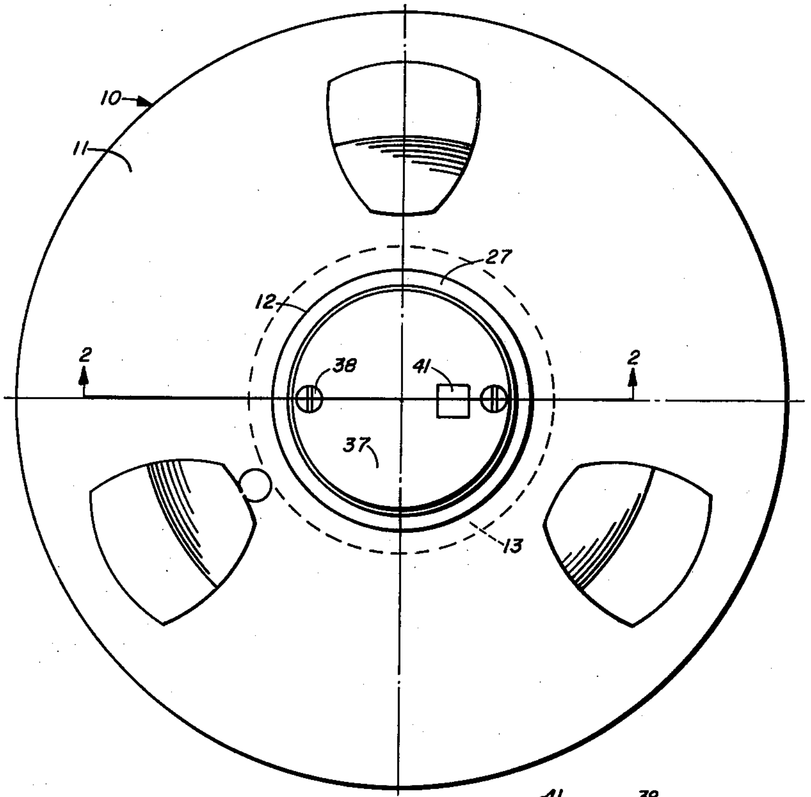
FIGURE 1 is a plan view illustrating the present invention together with a tape reel being held in operating position upon a turntable.
Figures 2, 3:
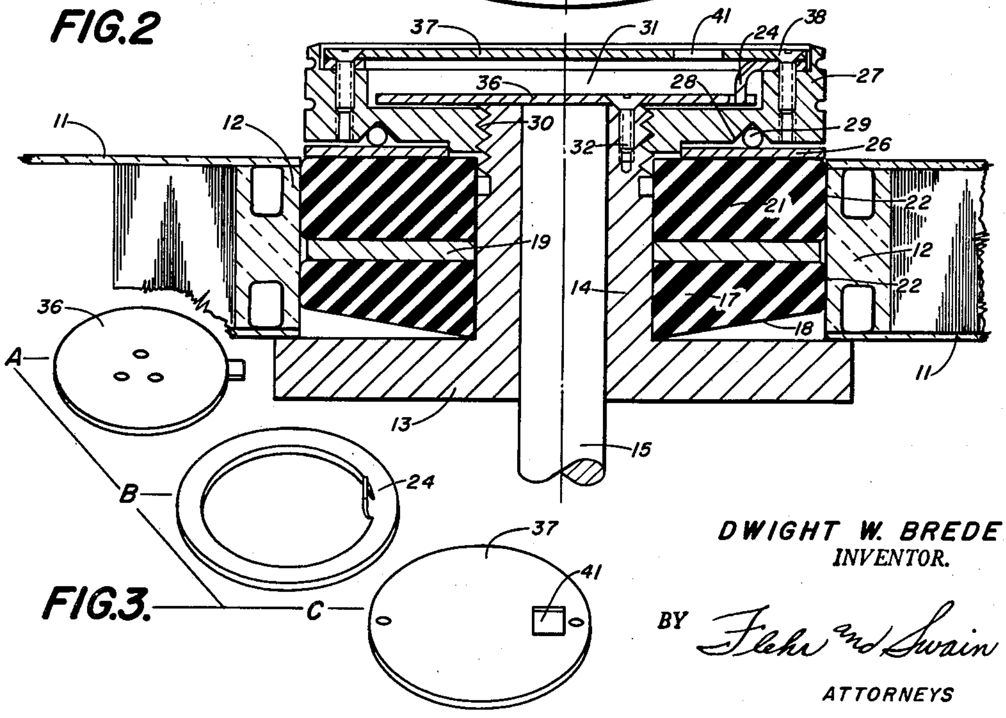
FIGURE 2 is a cross-sectional view taken along the line 2—2 of FIGURE 1.
FIGURE 3 is an exploded view of the indicator and stop rings shown in FIGURE 2.

In FIGURES 1 and 2 there is shown a tape reel 10 which includes the side walls 11 of a circular configuration attached to a rigid hub 12. A turntable 13 includes a hub 14 which engages a drive shaft 15.

The hub 14 receives the reel hold down assembly. The hold down assembly includes a first resilient ring 17. The ring 17 is formed whereby one surface 18 includes an inner portion which contacts the table and an outer portion spaced therefrom. The surface may, for example, be conical. A metallic spacer ring 19 is placed on the other surface of the ring 17, and a flat resilient ring 21 is disposed on the other surface. The resilient rings may, for example, be made of neoprene having a durometer hardness of from approximately 35 to 55.

Means are provided for exerting an axial pressure to the rings 17 and 21 whereby they expand radially outwardly. The central portion of the lower ring is compressed causing the outer edge and outer surface 22 to move towards the turntable. The outer surface is in frictional engagement with the adjacent reel hub because of the radial expansion. Thus, the reel is urged downwardly against the turntable.

Any suitable means may be employed for exerting axial pressure. The means illustrated comprises a back-up plate 26 and a knob 27 threadably received by the hub 14. The knob 27 is threaded 30 and is threadably received on a corresponding threaded portion of the hub 16. To reduce the friction between the back-up plate 26 and the rotatable knob 27, a circular groove 28 is formed in the knob and a plurality of balls 29 is disposed therein. These balls serve to transmit axial forces. The knob is recessed at 31 to receive an indicator plate 36. The indicator plate 36 is attached to the hub as by a bolt 32 whereby the knob rotates relative thereto. A cover plate 37 may close off the recess and be suitably attached to the knob as, for example, by means of spaced screws 38. An indicating window 41 may be formed in the plate and serve to provide means for observing the stationary indicating plate 36. A circular ring 24 is also fastened beneath the plate 37 by means of the screws 38, and is provided with a downwardly extending lip that engages a corresponding radially outwardly extending lip on the plate 36 at one limit of rotation of the knob 27. This arrangement prevents unthreading rotation of the knob beyond a convenient degree when the knob is being loosened to release the reel.

The indicator plate and window may provide means for displaying whether the reel knob has been tightened or whether it is in a loosened condition. Thus, a red flag or a marking may be provided on the indicator plate and will show up through the indicating window 41 when the reel knob is in disengaged position.

In operation, the knob is loosened and a hub 12 is placed over the reel hold down assembly. The knob 38 is then turned to cause an axial inward pressure against the resilient members 17 and 21. The force causes the members to expand radially outwardly and engage and tightly clamp the inner surface of the reel hub. The pressure also serves to compress the members axially whereby the members tend to move downwardly toward the turntable bringing the reel in contact with the surface of the turntable. The action serves not only to provide a firm clamping of the turntable but also to accurately maintain the turntable in alignment with the axis as well as its center coincident with the turntable.

I claim:

1. A tape reel hold down device for holding a tape reel upon a turntable, a hub extending upwardly from the turntable and adapted to engage a driving shaft, a resilient means carried by said hub, said resilient means being of substantially smaller diameter than said turntable, and the confronting portions of said resilient means and said turntable being engaged at the radially most inward portions thereof and diverging outwardly to define a substantial space between the radially more outward portions thereof, and means making threaded engagement with said hub and adapted to apply axial pressure to the resilient member whereby the member expands radially outwardly and downwardly to engage the associated reel hub.

2. A tape reel hold down device including a turntable portion having an upwardly extending hub adapted to receive a drive shaft, a first resilient means received by said hub and adapted to engage the turntable in its central portion and having is peripheral portion spaced from said turntable, a spacing member, a second resilient means carried by said hub, a pressure transfer ring overlying the second resilient means, a knob threadably received by the hub portion, the under surface of said knob including a circular groove, and a plurality of balls disposed in said groove and engaging the upper surface of the pressure transfer ring.

3. A mounting device for a tape reel of the class having a central hub opening, comprising: a turntable with a resilient member of smaller diameter coaxially mounted thereon, the confronting central portions of said turntable and member being engaged and the confronting radially more outward portions of said turntable and member being spaced apart, said resilient member having a peripheral surface engaging walls of said hub opening of said reel, and means for axially compressing said resilient member against said turntable, whereby said peripheral portion of said resilient member is distorted radially outward and axially toward said turntable to firmly engage said reel hub and to firmly seat said reel against said turntable.

4. A tape reel mounting device as characterized in claim 3, wherein said resilient member has a conical surface confronting said turntable.

References Cited in the file of this patent

UNITED STATES PATENTS

| | | |
|---|---|---|
| 1,518,026 | Van Sluys | Dec. 2, 1924 |
| 2,481,000 | Brunner | Sept. 6, 1949 |
| 2,564,746 | Bauer | Aug. 21, 1951 |
| 2,696,950 | Ranger | Dec. 14, 1954 |

FOREIGN PATENTS

| | | |
|---|---|---|
| 261,853 | Great Britain | Dec. 7, 1926 |